(12) United States Patent
Ferguson

(10) Patent No.: US 7,995,149 A0
(45) Date of Patent: Aug. 9, 2011

(54) SUBJECTIVELY WEIGHTED NOISE MEASUREMENT

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 528 days.

(21) Appl. No.: 10/780,816

(22) Filed: Feb. 18, 2004

(65) Prior Publication Data

US 2004/0160515 A1    Aug. 19, 2004

(51) Int. Cl.
*H04N 5/00* (2006.01)
*H04N 17/00* (2006.01)

(52) U.S. Cl. ........................................ 348/618; 348/180

(58) Field of Classification Search .................. 348/180, 348/184, 193, 192, 607, 608, 618, 619, 554–556
See application file for complete search history.

(56) References Cited

U.S. PATENT DOCUMENTS 5,731,841 A * 3/1998 Rosenbaum et al. ......... 348/463
* cited by examiner

*Primary Examiner* — Michael H. Lee
(74) *Attorney, Agent, or Firm* — Francis I. Gray; Michael A. Nelson; Matthew D. Rabdau

(57) ABSTRACT

Subjectively weighting noise measurements for multiple video formats based upon a defined standard for a standard definition video format uses a ratio between the active line time for the standard definition video format and the active line time for another video format to be measured in order to rescale a unified weighting filter for the standard definition video format for the another video format.

1 Claim, 3 Drawing Sheets

UNIFIED WEIGHTING CHARACTERISTIC   RESCALED FOR HDTV (REC. 567-2 FIG.22 INVERTED)

UNIFIED WEIGHTING CHARACTERISTIC   RESCALED FOR HDTV

SUBJECTIVELY WEIGHTED NOISE MEASUREMENT

BACKGROUND OF THE INVENTION

The present invention relates to the measurement of signals, and more particularly to a subjectively weighted noise measurement method for multiple video formats.

Noise measurement is important in analog video testing because noise can directly and indirectly cause visible degradation. The spectral distribution of noise at a given level is important for determining the perceived noise degradation in video. Because of this frequency sensitivity, standards were developed for filter specifications used in frequency weighting for noise measurements of video in standard definition television. However standards do not exist yet for filters in other video formats, such as high definition and computer video. The standard definition filter specifications are specified for a much lower bandwidth than the high definition and computer video formats. Simply using bandwidth ratios of new and old formats to scale the filter frequency parameters of the existing specification does not give the intended result.

Figure 1:
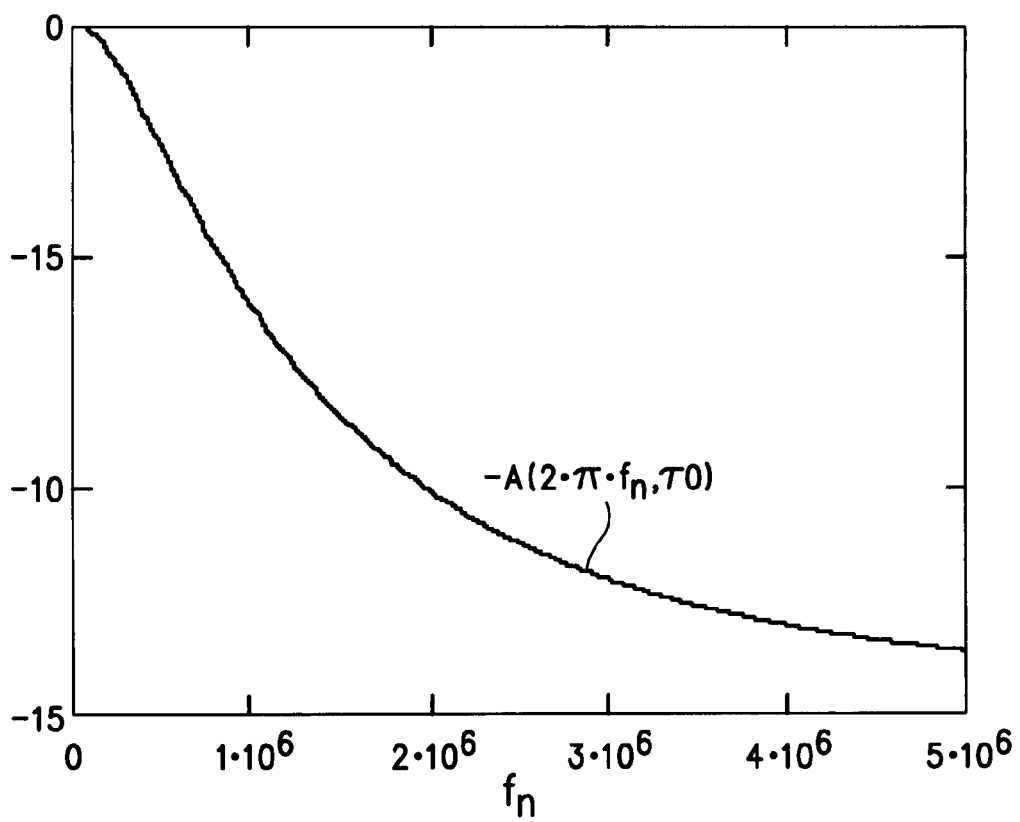

CCIR Recommendation (Rec) 576-2 FIG. 22, reproduced as FIG. 1 herein inverted to show attenuation as opposed to insertion loss, specifies the insertion loss versus frequency of a "unified weighting" filter for subjective weighting of noise for NTSC video. Filters meeting this specification have been implemented in analog, digital and software forms.

What is required is a perceptually consistent method of weighting noise present in analog video and equivalent digital representations across multiple formats. In particular it is desired to have one method of measurement for standard definition as well as other formats including high definition and computer video with variable sample rates, not necessarily known a priori or related to the clock rate of the corresponding digital video.

BRIEF SUMMARY OF THE INVENTION

Accordingly the present invention provides a subjectively weighted noise measurement for multiple video formats by using a ratio between the active line time for a standard definition video format, which has a standard defined insertion loss versus frequency, and the active line time for another video format to be measured to rescale a unified weighting filter for the standard definition video format for the another video format.

The objects, advantages and other novel features of the present invention are apparent from the following detailed description when read in conjunction with the appended claims and attached drawing.

BRIEF DESCRIPTION OF THE SEVERAL VIEW OF THE DRAWING

FIG. 1 is a graphic view of attenuation versus frequency based on an insertion loss standard for standard definition video.

DETAILED DESCRIPTION OF THE INVENTION

The present invention rescales for a given video format the frequency axis of the standard specified in Rec 567-2 FIG. 22, shown as attenuation verus frequency in FIG. 1, by the ratio of active line time for the given video format to a standard definition active line time. Equivalently a 245 nanosecond time constant t0, given in Rec 567-2 FIG. 22, is scaled by the ratio of NTSC active line time to active line time of the given video format.

Figure 2A:
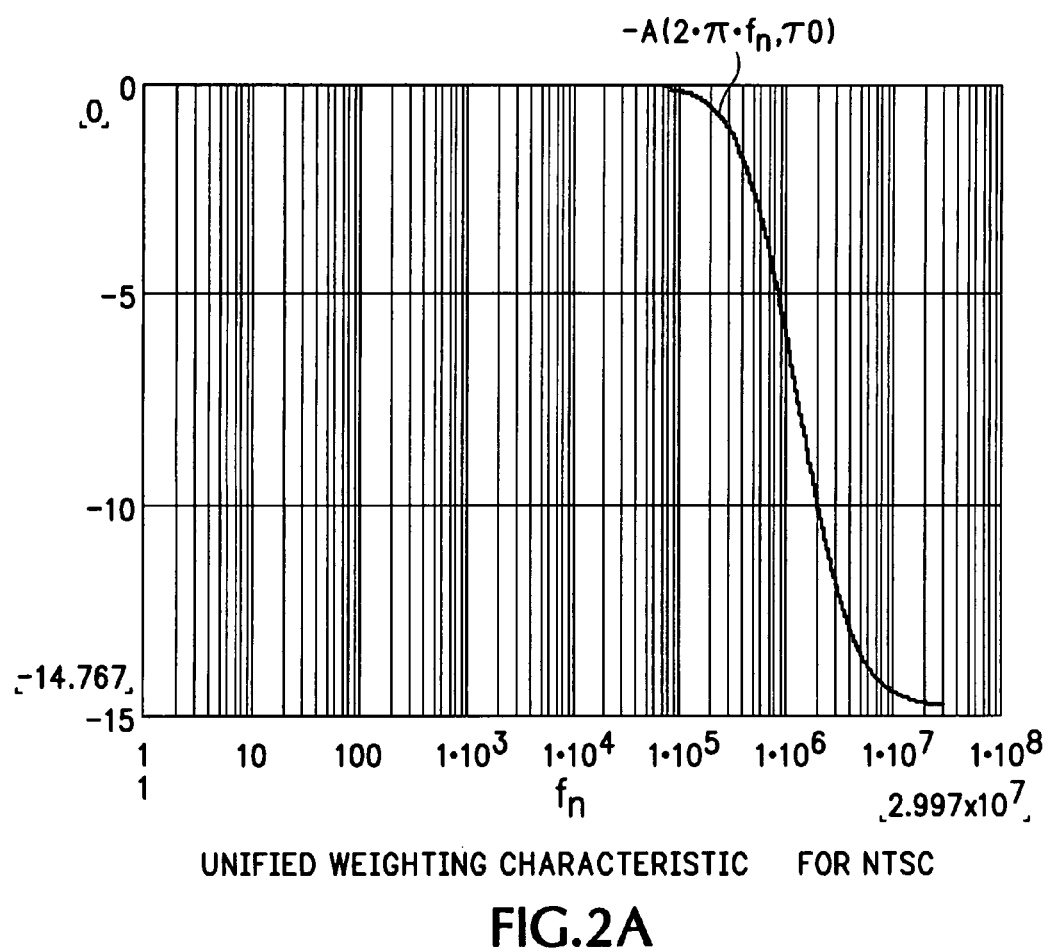
Figure 2B:
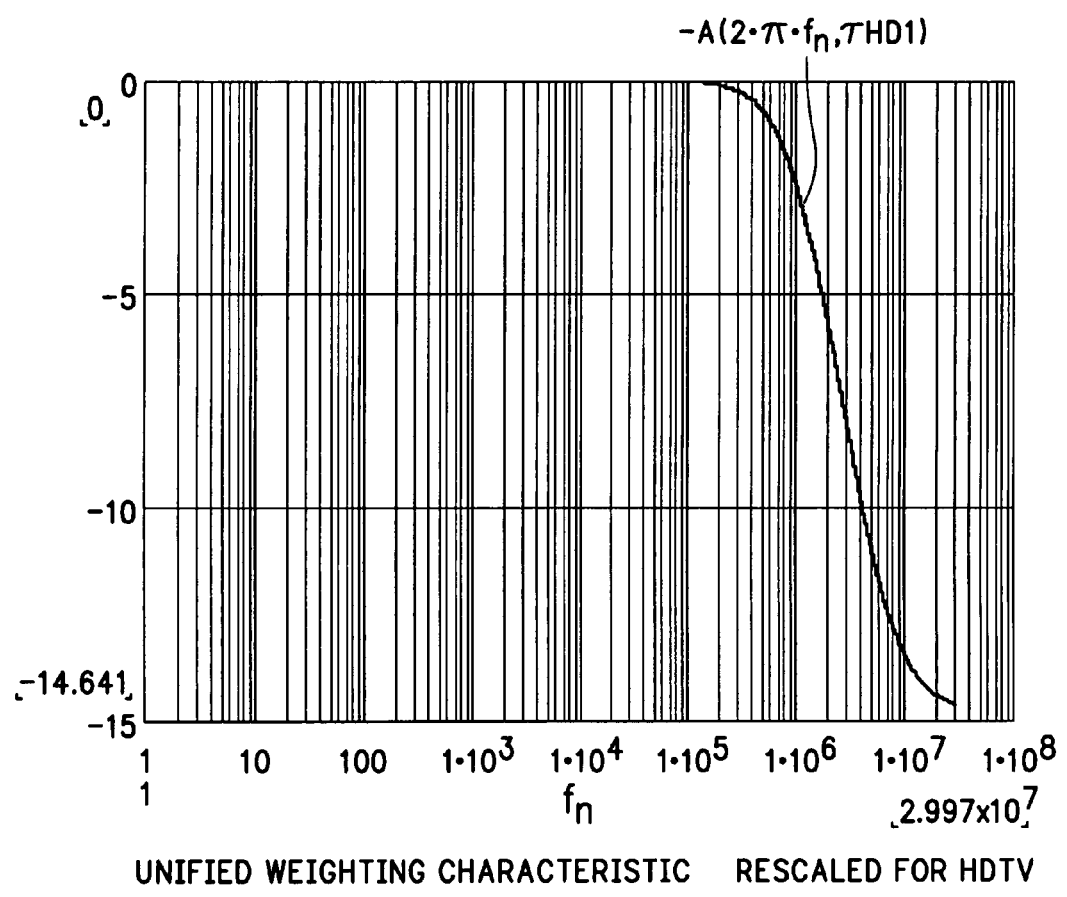

The following example is for weighting noise for high definition (HD) television having a 1920×1080i 59.94 Hz format. While the bandwidth and clock ratios are both approximately 5.5, the active line time for NTSC is 53.3 μsec while the line time for the HD format is 25.9 μsec, giving an active line time ratio of 2.058. Thus for a mapping of a single frequency component of noise to screen width, the bandwidth or clock ratios are off by a factor of about 2.05. Therefore the standard time constant t0 of 245 nsec is divided by the active line time ratio to arrive at a time constant of 245/2.058=119 nsec for the HD format. The rescaled unified weighting characteristic for this HD format is shown in FIG. 2B, compared to the standard unified weighting characteristic for NTSC shown in FIG. 2A for comparison.

For the 1280×720p format bandwidth and clock ratios are also about 5.5, but the active line time for 59.94 Hz is about 17.26 microseconds with a corresponding ratio of 3.088 and a time constant of 245/3.088=79.3 nsec. The standard unified weighting characteristic is accordingly rescaled as above for this HD format.

Thus the present invention provides a method of subjectively weighting noise measurements for multiple video formats by using a ratio between line time for a standard defined format and a line time for another format to scale the standard defined filter specification for the other format.

What is claimed is:

1. A method of subjectively weighting noise measurement for multiple video formats based on a defined filter specification of insertion loss versus frequency for a standard definition video format comprising the steps of:
   - determining a ratio between an active line time for the standard definition video format and an active line time for another video format; and
   - rescaling a unified weighting filter for the standard definition video format using the ratio to adapt the unified weighting filter for the another video format.

\* \* \* \* \*